(12) United States Patent
Liu et al.

(10) Patent No.: US 10,866,610 B2
(45) Date of Patent: Dec. 15, 2020

(54) KNOB STRUCTURE AND FOLLOW FOCUS REMOTE CONTROLLER USING SAME

(71) Applicant: SZ DJI OSMO TECHNOLOGY CO., LTD., Shenzhen (CN)

(72) Inventors: Guoyao Liu, Shenzhen (CN); Yanchong Zhao, Shenzhen (CN); Weidong Li, Shenzhen (CN); Paul Pan, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 298 days.

(21) Appl. No.: 15/958,577

(22) Filed: Apr. 20, 2018

(65) Prior Publication Data
US 2018/0239387 A1    Aug. 23, 2018

Related U.S. Application Data

(63) Continuation of application No. PCT/CN2015/092340, filed on Oct. 20, 2015.

(51) Int. Cl.
*G05G 1/12* (2006.01)
*G05G 5/03* (2008.04)
*G05G 1/08* (2006.01)
*H04N 5/232* (2006.01)
*G03B 3/12* (2006.01)

(52) U.S. Cl.
CPC ............ *G05G 1/12* (2013.01); *G05G 1/08* (2013.01); *G05G 5/03* (2013.01); *H04N 5/232* (2013.01); *G03B 3/12* (2013.01)

(58) Field of Classification Search
CPC .. G05G 1/08; G05G 1/10; G05G 1/12; G05G 5/03; G05G 5/04; G03B 3/12; G03B 17/566; H01H 1/50; H01H 3/08; H01H 3/02; H01H 3/58; H01H 19/14; H03J 1/14

See application file for complete search history.

(56) References Cited

U.S. PATENT DOCUMENTS 1,802,505 A * 4/1931 Griffoul ................ H03J 1/14
74/10.54
2,505,548 A * 4/1950 Hutt ...................... H01H 21/40
200/430

(Continued)

FOREIGN PATENT DOCUMENTS

CN        201097080 Y     8/2008
CN        201689358 U    12/2010

(Continued)

OTHER PUBLICATIONS

Machine Translation of CN 204557279, obtained Jan. 16, 2020.*

(Continued)

*Primary Examiner* — Richard W Ridley
*Assistant Examiner* — Brian J McGovern
(74) *Attorney, Agent, or Firm* — Anova Law Group, PLLC

(57) ABSTRACT

A knob structure includes a fixed member, a rotational assembly, and a damping element. The fixed member includes a carrying platform. The rotational assembly is rotatably disposed on the fixed member. The damping element is disposed between the carrying platform and the rotational assembly. A contact area between the carrying platform and the damping element is configured to be changed by a rotation of the rotational assembly.

20 Claims, 17 Drawing Sheets

(56) References Cited

U.S. PATENT DOCUMENTS

| | | | | |
|---|---|---|---|---|
| 7,866,899 B2* | 1/2011 | Kope | ............... | F16M 11/041 |
| | | | | 396/423 |
| 2003/0025802 A1* | 2/2003 | Mayer, Jr. | ............ | G03B 7/12 |
| | | | | 348/211.99 |
| 2014/0374228 A1* | 12/2014 | Park | .................. | H01H 19/11 |
| | | | | 200/336 |

FOREIGN PATENT DOCUMENTS

| | | | | |
|---|---|---|---|---|
| CN | 102076513 A | | 5/2011 | |
| CN | 103257425 A | | 8/2013 | |
| CN | 104092949 A | | 10/2014 | |
| CN | 204536980 U | | 8/2015 | |
| CN | 204557279 U | | 8/2015 | |
| CN | 204595667 U | | 8/2015 | |
| GB | 602184 A | * | 5/1948 | ............ B43L 13/08 |
| JP | H08211957 A | | 8/1996 | |
| JP | H09-34575 | * | 2/1997 | ............ G05G 1/10 |
| KR | 20140014716 A | | 2/2014 | |

OTHER PUBLICATIONS

Machine Translation of JP H09-34575, obtained Jan. 16, 2020.*
The World Intellectual Property Organization (WIPO) International Search Report for PCT/CN2015/092340 dated Jul. 26, 2016 6 Pages (including translation).

* cited by examiner

KNOB STRUCTURE AND FOLLOW FOCUS REMOTE CONTROLLER USING SAME

This application is a continuous application of International Application No. PCT/CN2015/092340, filed on Oct. 20, 2015, the entire contents of which are incorporated herein by reference.

TECHNICAL FIELD

Technical Field

The present disclosure relates to a knob structure, and more particularly to a knob structure for controlling an imaging device and a follow-focus remote controller having the knob structure.

Background of the Disclosure

Conventional follow-focus remote controllers can control a focusing of an imaging device with a knob structure. The knob structure can comprise a fixed member, a rotational assembly rotatable relative to the fixed member and a damping grease provided between the rotational assembly and the fixed member. The rotational assembly can be made of an elastic material such as plastic or rubber, while the fixed member can be made of metal. A rotational resistance between the rotational assembly and the fixed member can be adjusted by changing a pressure applied to the damping grease from the rotational assembly and the fixed member, and thus a smooth rotation of the rotational assembly relative to the fixed member can be effected. However, a limited volume of the damping grease can be provided as a contact area between the rotational assembly and the fixed member is small. A leakage of the damping grease from a space between the rotational assembly and the fixed member may happen if the pressure applied on the damping grease from the rotational assembly and the fixed member is increased. In such cases, a friction between the rotational assembly and the fixed member can be increased due to a direct contact therebetween, leading to a degraded feedback in adjusting the knob structure. This can hamper a precise adjustment of a rotation angle of the knob structure and a focusing control of the imaging device. In addition, a range of damping adjustment of the knob structure is limited.

SUMMARY OF THE DISCLOSURE

There is a need for a knob structure having a large range of damping adjustment, and a follow-focus remote controller having the knob structure.

An aspect of the disclosure provides a knob structure comprising a fixed member and a rotational assembly rotatably disposed on the fixed member. The rotational assembly can be disposed on the fixed member, the fixed member comprising a carrying platform. The knob structure can further comprise a damping element disposed between the carrying platform and the rotational assembly. A contact area between the carrying platform and the damping element can be changed by a rotation of the rotational assembly.

In some embodiments, a side of the damping element facing the fixed member can be provided with an inclined surface.

In some embodiments, the knob structure can further comprise a central shaft rotatably disposed on the fixed member. The rotational assembly and the damping element can be sleeved on the central shaft.

In some embodiments, the rotational assembly can comprise an operation member, an adjusting wheel, a hand wheel and a mating wheel. The operation member can be provided on the adjusting wheel, a rotation of the operation member under an external force can drive a rotation of the adjusting wheel. The adjusting wheel can be rotatably accommodated in the hand wheel, the hand wheel can be sleeved on the mating wheel, and the mating wheel can be rotatably disposed on the fixed member. The adjusting wheel, the hand wheel and the mating wheel can be sleeved on the central shaft and rotate along with a rotation of the central shaft.

In some embodiments, a fitting between the mating wheel and the central shaft can be a form fit or an interference fit.

In some embodiments, the knob structure can further comprise a pressure knob rotatably disposed on the central shaft. The pressure knob can be fixedly connected to the adjusting wheel. The pressure knob can move axially relative to the central shaft when being rotated.

In some embodiments, a fitting between the adjusting wheel and the pressure knob can be a form fit or an interference fit.

In some embodiments, an external thread can be provided on the central shaft, an internal thread can be provided at the pressure knob, and the central shaft and the pressure knob can be screw-connected with the external thread and the internal thread.

In some embodiments, a plurality of snapping portions can be formed on the pressure knob. An engaging portion engaging with the snapping portions can be formed on the central shaft. The pressure knob can selectively engage with one of the plurality of snapping portions under an external force to adjust an axial position of the pressure knob with respect to the central shaft.

In some embodiments, one of the snapping portions and the engaging portion can be a groove, and the other one of the snapping portions and the engaging portion can be a protrusion fitted into the groove.

In some embodiments, a first elastic member can be provided between the adjusting wheel and the pressure knob. The first elastic member can be sleeved on the pressure knob.

In some embodiments, the knob structure can further comprise a retaining member provided between the rotational assembly and the damping element. The retaining member can abut against the damping element to prevent a releasing of the damping element from the fixed member due to an upward deformation of the damping element.

In some embodiments, the knob structure can further comprise a pressure plate rotatably provided on the central shaft, the pressure plate being provided between the pressure knob and the damping element. The pressure plate can moves axially toward the damping element to apply an axial pressure thereto upon an axial movement of the pressure knob.

In some embodiments, the knob structure can further comprise a second elastic member provided between the pressure plate and the pressure knob. The second elastic member can be sleeved on the central shaft.

In some embodiments, the second elastic member can be a wave spring.

In some embodiments, the damping element can comprise a plurality of damping blocks evenly spaced apart from each other.

In some embodiments, the retaining member can include a cylindrical shape. Stoppers can protrude from a side of the retaining member facing the damping element. The stoppers can correspond to the damping blocks.

In some embodiments, the mating wheel can include a ring structure having through-holes for accommodating the plurality of damping blocks. A spoke can be provided between adjacent damping blocks s to separate the damping blocks and prevent a radial deformation of the damping blocks.

In some embodiments, the pressure plate can comprise two disks provided in a coaxial manner. A diameter of a first disk of the two disks remote from the damping element can be smaller than a diameter of a second disk of the two disks in proximity to the damping element.

In some embodiments, the pressure knob can comprise a sleeve portion and a guiding portion provided in a coaxial manner. The sleeve portion can be fixedly connected to the adjusting wheel. The guiding portion can abut against the second disk when moving axially. The first disk can be capable of being accommodated in the guiding portion.

In some embodiments, a damping grease can be provided between the damping element and the carrying platform.

In some embodiments, a damping grease can be provided between the damping element and the mating wheel.

In some embodiments, a penetration hole can be provided penetrating the fixed member, a bearing being provided in the penetration hole. The connecting shaft can pass through the penetration hole and be coupled to the bearing. The connecting shaft can be rotatably connected to the fixed member through the bearing.

In some embodiments, the bearing can be a ball bearing or sliding friction pairs.

Another aspect of the disclosure provides a follow-focus remote controller comprising a remote controller body and a knob structure fixedly disposed on the remote controller body. The knob structure can be the knob structure described hereinabove.

LIST OF REFERENCE NUMERALS

TABLE 1

Figure 1:
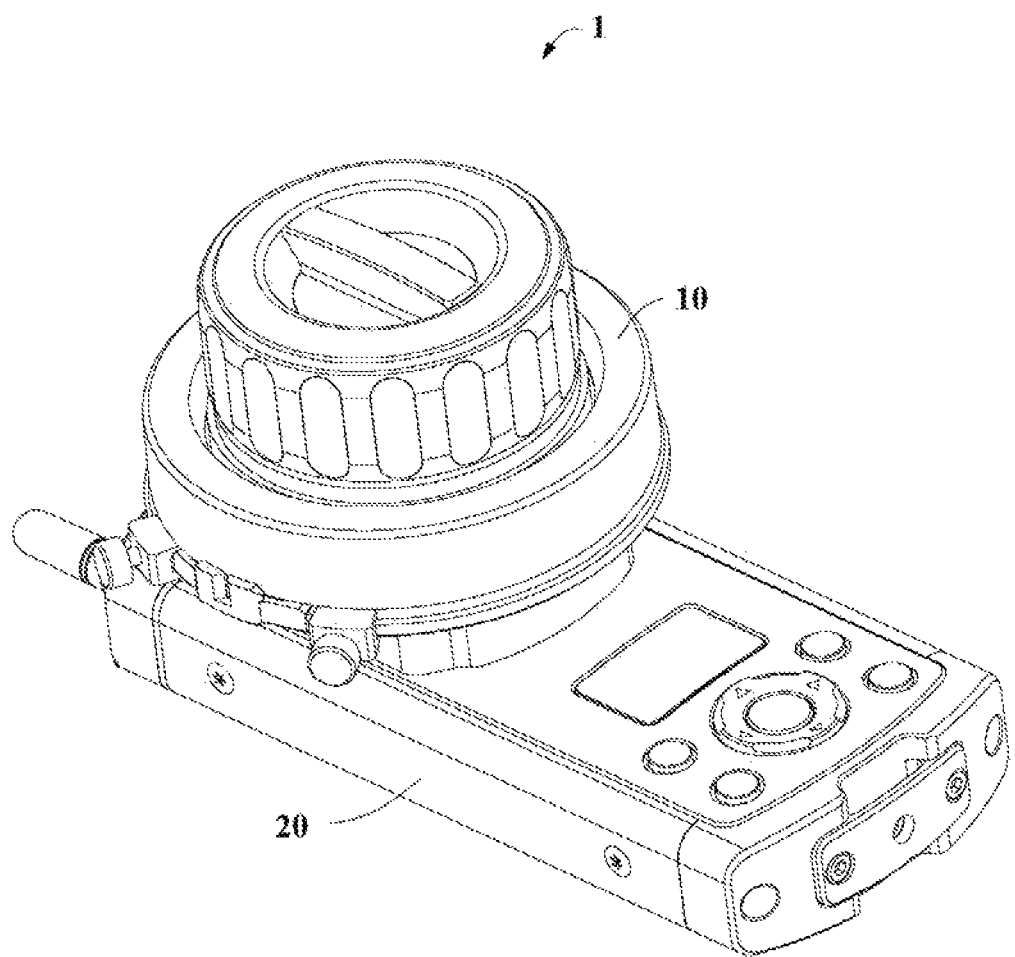
FIG. 1 shows a follow-focus remote controller in accordance with embodiments of the disclosure.

| | |
|---|---|
| Follow-focus remote controller | 1, 3 |
| Body | 20, 32 |
| Knob structure | 10, 30 |

TABLE 1-continued

| | |
|---|---|
| Fixed assembly | 100 |
| Bearing | 101 |
| Bearing through hole | 1011 |
| Fixed member | 102 |
| Bearing portion | 1021 |
| Carrying platform | 1022 |
| Penetration hole | 1023 |
| Central shaft | 103 |
| Mating portion | 1030 |
| Snapping portion | 1032 |
| Connecting portion | 1033 |
| Fixed portion | 1034 |
| Sheathing portion | 1035 |
| Rotational assembly | 300 |
| Operating member | 301 |
| Adjusting wheel | 302 |
| Snapping portion | 3020 |
| Hand wheel | 304 |
| Mounting hole | 3040, 3060 |
| Mating wheel | 306 |
| Central disk | 3062 |
| Through-hole | 3064, 5042 |
| Spoke | 3066 |
| Accommodation hole | 3068 |
| Adjusting assembly | 500 |
| First elastic member | 501 |
| Pressure knob | 502 |
| Sleeve portion | 5020 |
| Guiding portion | 5022 |
| Step | 5024 |
| Retaining member | 504 |
| Mounting portion | 5040 |
| Stopper | 5044 |
| Second elastic member | 506 |
| Pressure plate | 508 |
| Pressure plate through-hole | 5080 |
| First disk | 5082 |
| Second disk | 5084 |
| Damping plate | 70 |
| Damping block | 700 |
| Dangling member | 34 |
| Holding hole | 320 |
| Inner wall | 322 |
| Groove | 324 |
| Hanging ring | 340 |
| Casing | 342 |
| Movable member | 344 |
| Insertion portion | 3420 |
| Operating portion | 3422 |
| Protrusion | 3424 |
| Slider | 3426 |
| Plug | 3428 |
| First end portion | 3440 |
| Middle portion | 3442 |
| Sliding portion | 3444 |
| Locking portion | 3446 |
| Third elastic member | 3448 |

The present disclosure will be described in the illustrative embodiments by reference to the drawings.

DETAILED DESCRIPTION OF THE DISCLOSURE

A better understanding of the disclosure will be obtained by reference to the following detailed description that sets forth illustrative embodiments with reference to the drawings. It will be apparent that, the embodiments described herein are merely provided by way of example only. Those skilled in the art can conceive other embodiments in light of those embodiments disclosed herein without inventive efforts, and all these embodiments are within the scope of the disclosure.

It is apparent that, when a component is described as "being fixed to" another component, it can be directly fixed to said another component, or an intermediate component can be provided therebetween. When a component is described as "being coupled to" another component, it can be directly coupled to said another component, or an intermediate component can be provided therebetween. When a component is described as "being disposed on" another component, it can be disposed directly on said another component, or an intermediate component can be provided therebetween. Terms such as "vertical", "horizontal", "left" and "right", as used in the disclosure, are merely illustrative.

Unless otherwise defined, technical and scientific terms, as used in the disclosure, have the same meaning as commonly understood by those skilled in the field of the disclosure. The terms as used in the disclosure are intended to illustrate the embodiments, rather than to limit the disclosure. The term "and/or", as used in the disclosure, comprises any and all combinations of one or more items as listed.

FIG. 1 shows a follow-focus remote controller 1 in accordance with embodiments of the disclosure. The follow-focus remote controller 1 can be wirelessly connected to a follow focus actuator (not shown) provided on an imaging device such as an image camera or a video camera. The follow focus actuator can engage with a focus ring or an aperture adjusting ring of the imaging device. The follow-focus remote controller 1 can remotely control the follow focus actuator to effect an adjustment of focal length, focusing, or an adjustment of aperture of the imaging device. The follow-focus remote controller 1 can comprise a knob structure 10 and a body 20. The body 20 can be provided with an angle sensor (not shown) and a controller (not shown) in communication with the angle sensor. The angle sensor can sense a rotation angle of the knob structure 10, and provide the sensed rotation angle to the controller. The controller can provide a corresponding control command to thereby control an adjustment of focal length or focusing or an adjustment of aperture ring of the imaging device.

Figure 2:
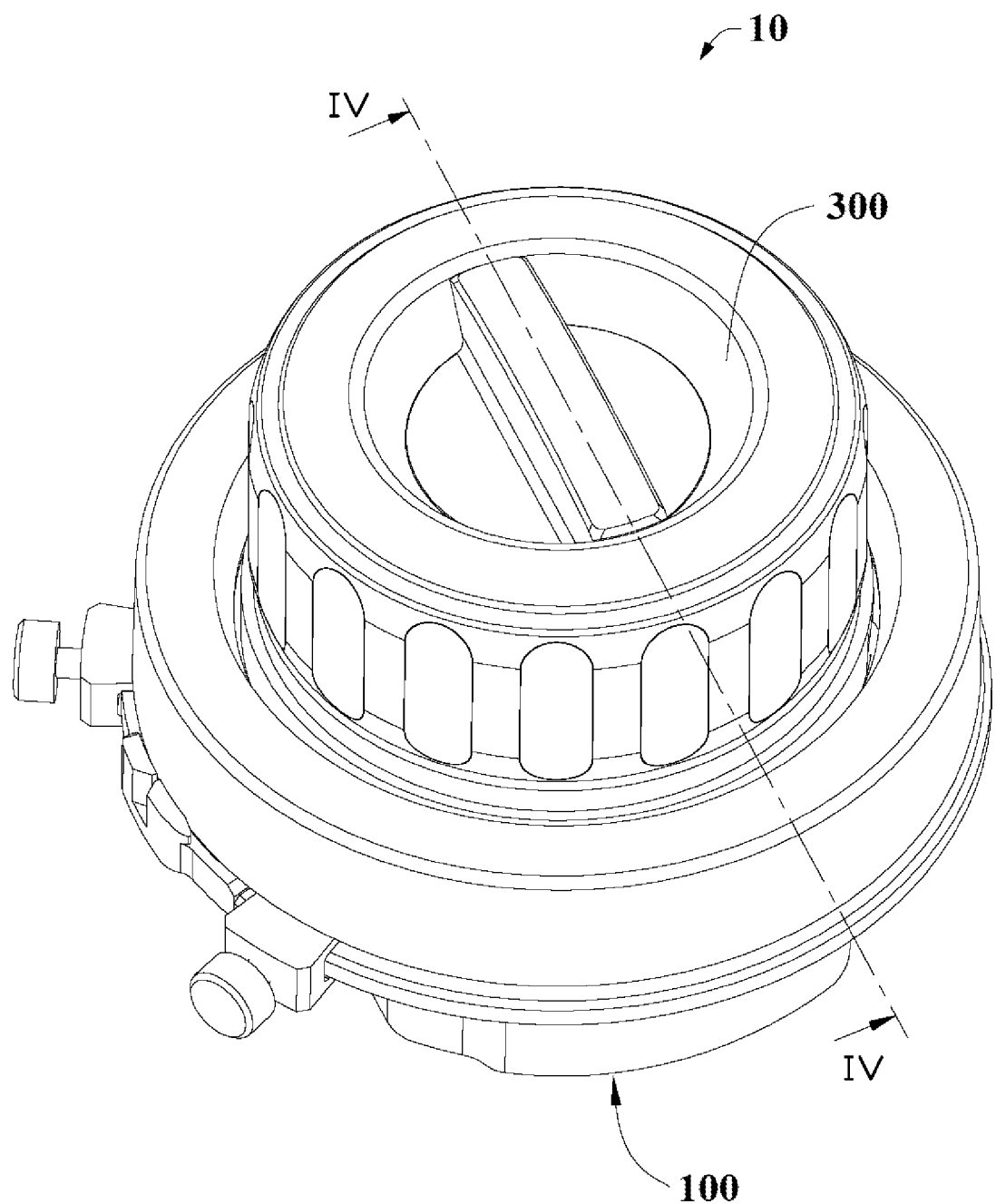
FIG. 2 shows an assembled knob structure of the follow-focus remote controller in accordance with embodiments of the disclosure.

Referring to FIG. 2, the knob structure 10 can comprise a fixed assembly 100 and a rotational assembly 300 rotatably connected to the fixed assembly 100.

Figure 3:
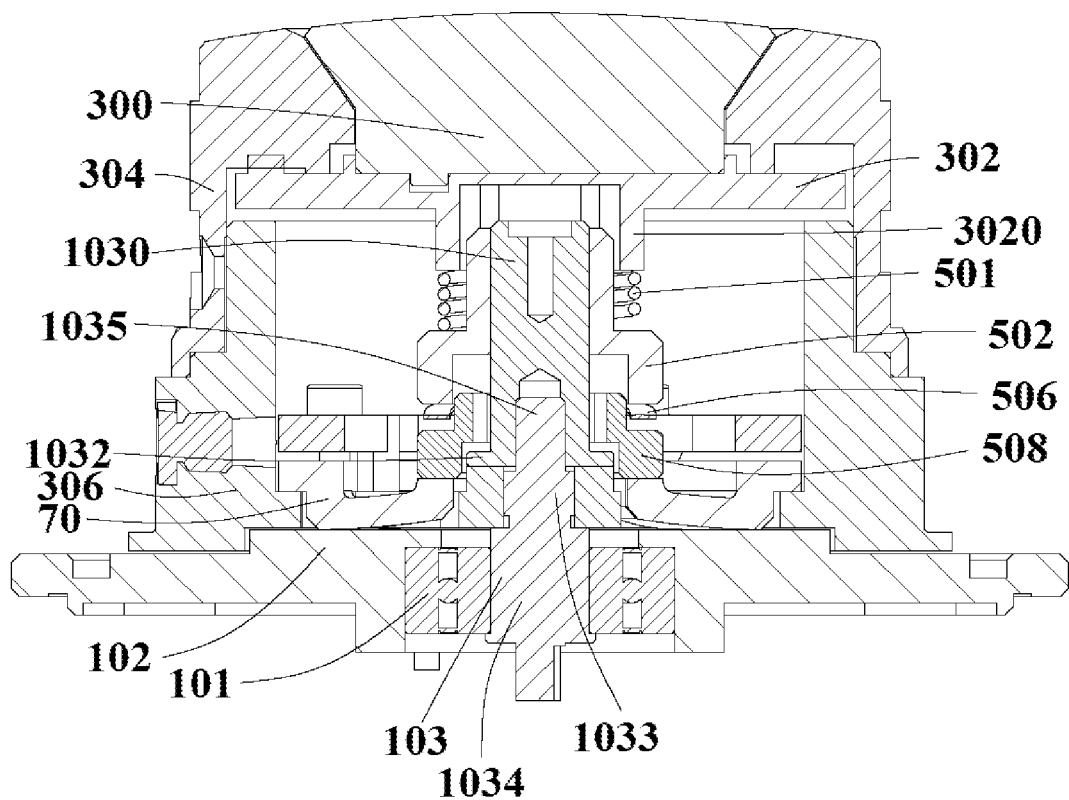
FIG. 3 is a cross-sectional view of the knob structure of FIG. 2 along an IV-IV line.
Figure 4:
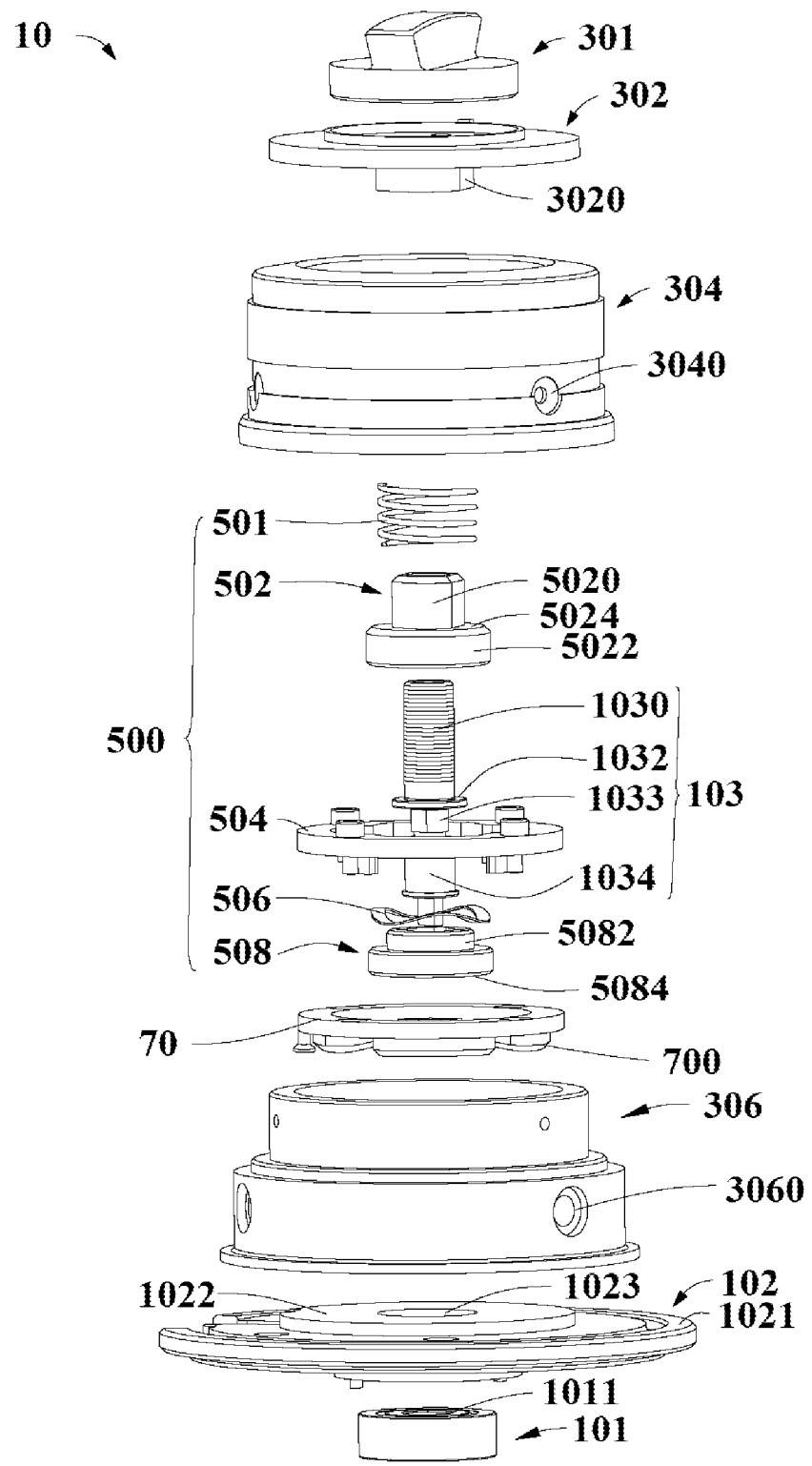
FIG. 4 shows an exploded view of the knob structure of FIG. 2.

Referring to FIGS. 3-4, the knob structure 10 can comprise an adjusting assembly 500 provided within the rotational assembly 300. The fixed assembly 100 can comprise a fixed member 102, a central shaft 103 and a bearing 101 rotatably coupling the central shaft 103 to the fixed member 102.

The fixed member 102 can support the rotational assembly 300 and the Adjusting assembly 500 thereon. In some embodiments, the fixed member 102 can be a flange which is made of a metal or an alloy such as a steel or an aluminum alloy. Optionally, the fixed member 102 can be made of a plastic or a rubber. The fixed member 102 can comprise an bearing portion 1021 and a carrying platform 1022 provided on the bearing portion 1021. The carrying platform 1022 can be provided in a substantially disk shape. A penetration hole 1023 can be provided at a center of the carrying platform 1022.

The bearing 101 can be accommodated in the penetration hole 1023 to rotatably couple the central shaft 103 to the fixed member 102. In some embodiments, the bearing 101 can be provided in a substantially cylinder shape. The bearing 101 can comprise a bearing through hole 1011. The bearing 101 can be coaxially provided in the penetration hole 1023 or at a bottom of the fixed member 102. The bearing 101 can be engaged with the central shaft 103 by a thread fit or an interference fit, such that the central shaft 103 can rotate with the bearing 101 relative to the fixed member 102. Alternatively, the bearing 101 can be fixed to the fixed member 102 or formed integrally with the fixed member 102. The central shaft 103 can be rotatably accommodated in the bearing through hole 1011 of the bearing 101.

Figure 5:
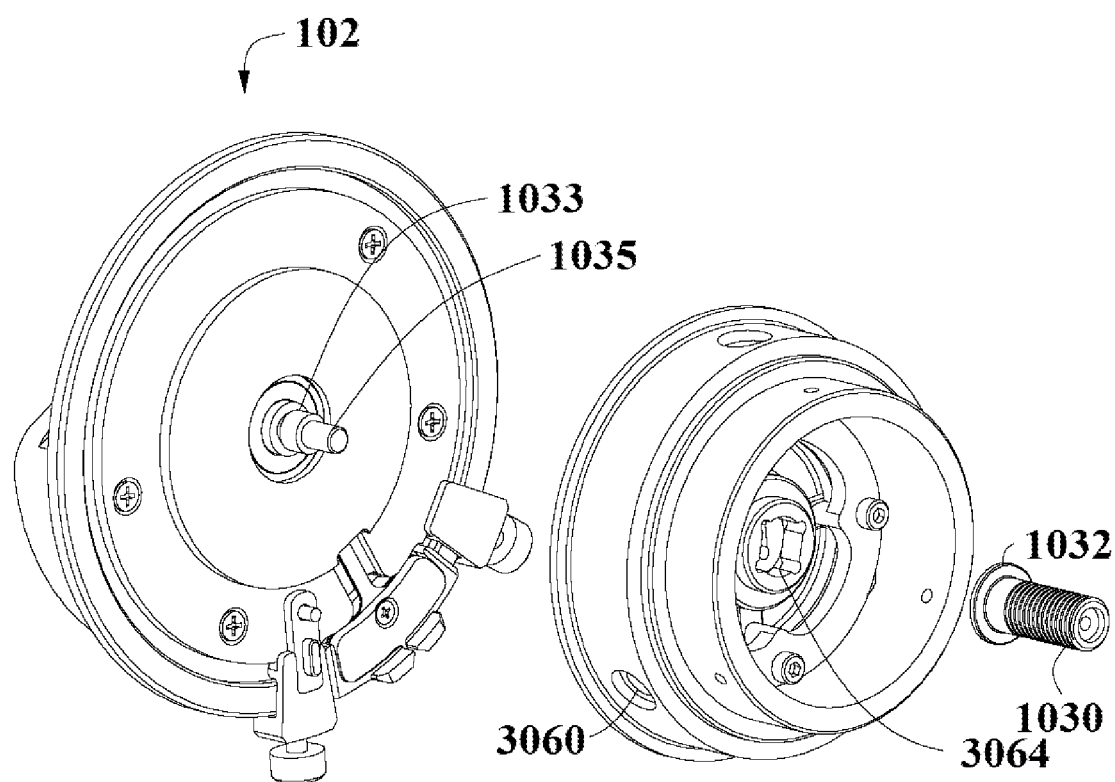
FIGS. 5-12 show elements of the knob structure of FIG. 2 from various point of views.

Referring to FIGS. 3-5, the central shaft 103 can comprise a mating portion 1030, a snapping portion 1032, a connecting portion 1033, a fixed portion 1034 and a sheathing portion 1035. The snapping portion 1032 can be fixedly provided at an end of the mating portion 1030. The connecting portion 1033 can be connected to the sheathing portion 1035 and the fixed portion 1034. The fixed portion 1034 can mate with the bearing 101 to rotatably attach the central shaft 103 on the fixed member 102. The mating portion 1030 can be sleeved on the sheathing portion 1035. In some embodiments, the mating portion 1030 can be mated with the sheathing portion 1035 by an interference fit. Alternatively, the mating portion 1030 can be engaged with the sheathing portion 1035 by a thread fit, a form fit or a snap fit. The form fit between the mating portion 1030 and the sheathing portion 1035 can be effected by providing a structure in the mating portion 1030 which engages with the sheathing portion 1035. In some instances, the structure provided in the mating portion 1030 can be square, star or other alike. Optionally, the structure can be provided with any shape as long as a relative rotation between the mating portion 1030 and the sheathing portion 1035 can be prevented when the mating portion 1030 is sleeved on the sheathing portion 1035. The snap fit between the mating portion 1030 and the sheathing portion 1035 can be effected by providing a snapping part protruding from one of an inner surface of the mating portion 1030 and an outer surface of the sheathing portion 1035 and providing a corresponding groove on the other one of the inner surface of the mating portion 1030 and the outer surface of the sheathing portion 1035. It will be appreciated that, the mating portion 1030 can be engaged with the sheathing portion 1035 by other structures as long as the relative rotation between the mating portion 1030 and the sheathing portion 1035 can be prevented when the mating portion 1030 is sleeved on the sheathing portion 1035.

Figure 6:
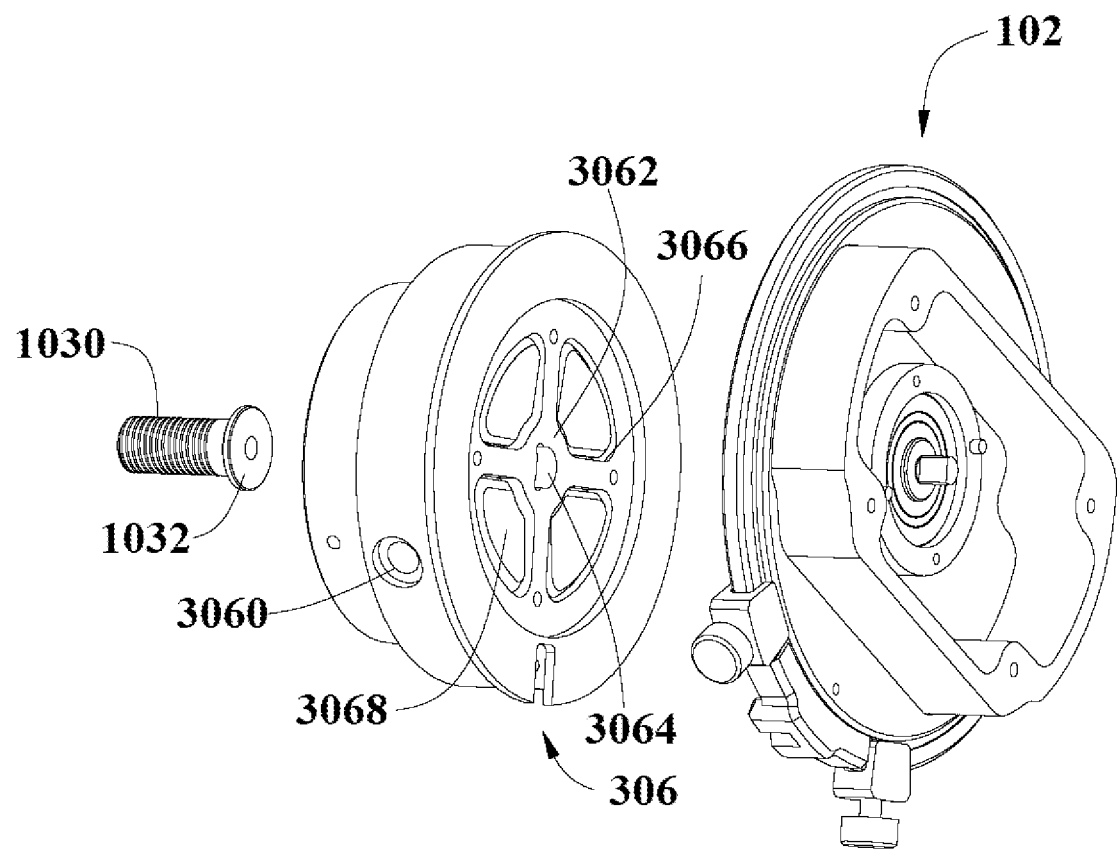
Figure 11:
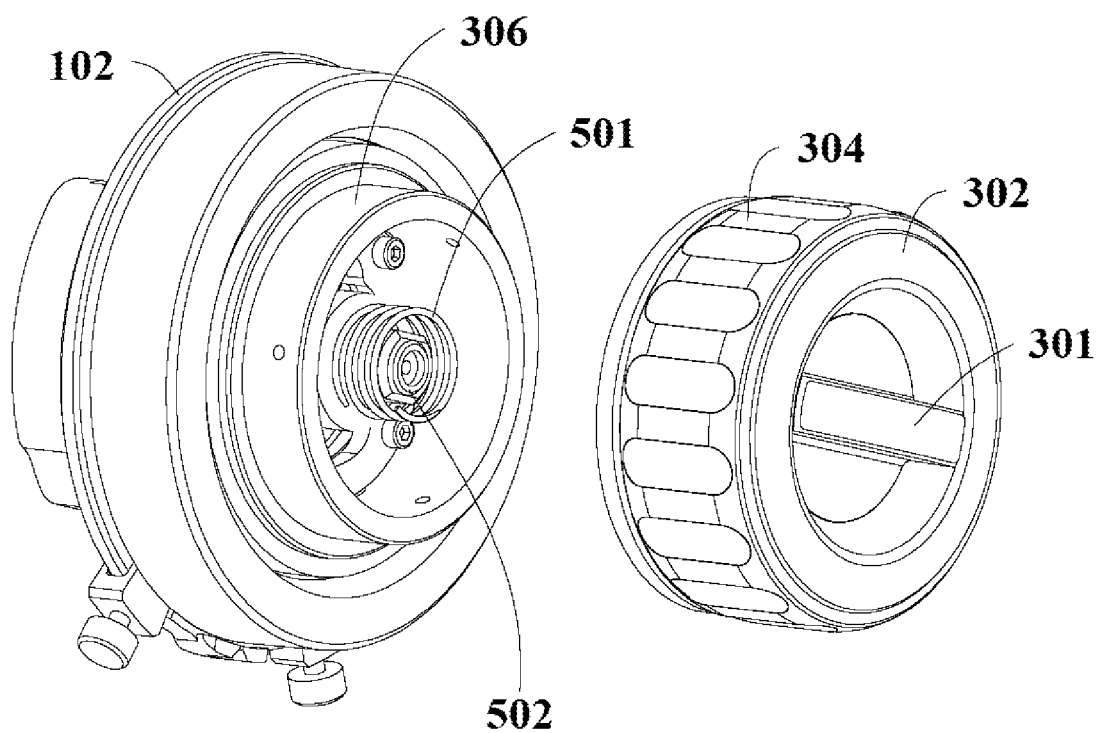
Figure 12:
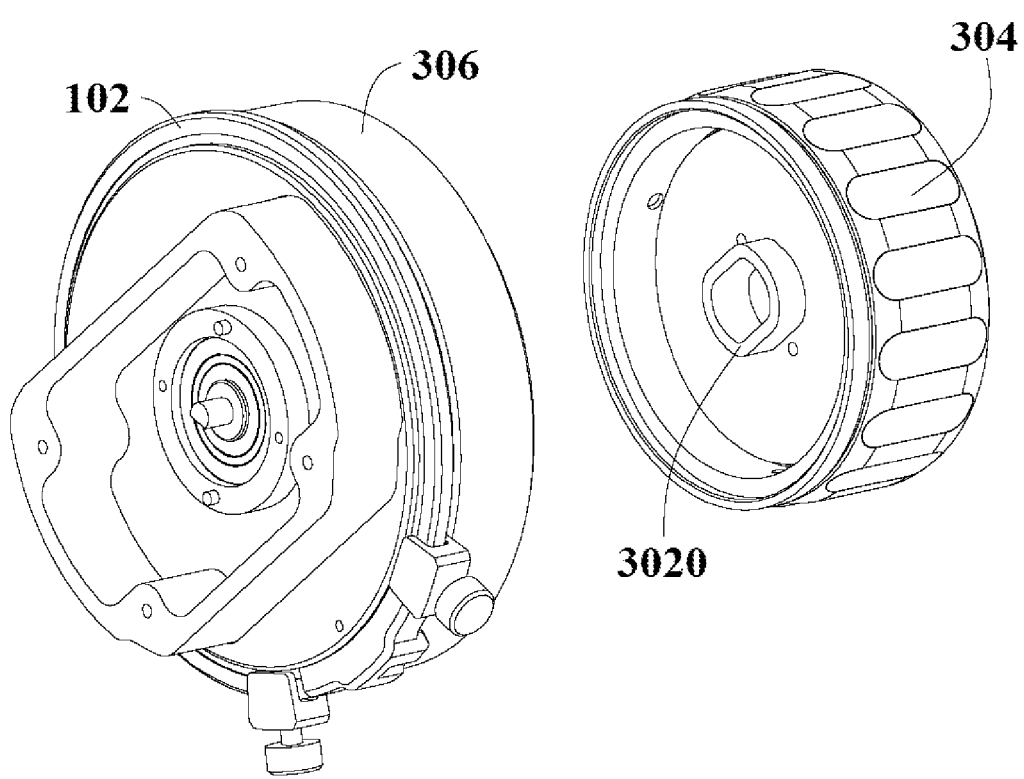

Referring to FIGS. 3-4 and FIGS. 11-12, the rotational assembly 300 can be rotatably connected to the fixed member 102. The rotational assembly 300 can comprise an operating member 301, an adjusting wheel 302, a hand wheel 304 and a mating wheel 306. The operating member 301 can be partially accommodated in the adjusting wheel 302. The adjusting wheel 302 can be substantially a disk like. The adjusting wheel 302 can be provided with a snapping portion 3020 (as shown in FIG. 12) protruding from a side remote to the operating member 301. The adjusting wheel 302 can be rotatably accommodated in the hand wheel 304. Once an external force is applied to rotate the operating member 301, the adjusting wheel 302 can be driven by the operating member 301 to rotate relative to the hand wheel 304. The hand wheel 304 and the mating wheel 306 can be provided with a substantially cylindrical shape. A mounting hole 3040 can be provided on a circumferential wall of the hand wheel 304. A mounting hole 3060 can be provided on a circumferential wall of the mating wheel 306. The hand wheel 304 can be locked to the mating wheel 306 by the mounting holes 3040 and 3060. Referring to FIG. 6, a central disk 3062 can be provided on a side of the mating wheel 306 facing the fixed member 102. A through-hole 3064 can be provided at a center of the central disk 3062 for passing the central shaft 103 therethrough. The mating wheel 306 can be provided with a radially extending spoke 3066 which is connected between the central disk 3062 and a circumference of the mating wheel 306. In some embodiments, four spokes 3066 can be provided which are evenly disposed between the central disk 3062 and the circumference of the mating wheel 306. An accommodation hole 3068 can be formed between adjacent spokes 3066.

Referring to FIGS. 3-4, the adjusting assembly 500 can be provided at an end of the central shaft 103 which is remote from the fixed member 102 for adjusting a relative distance between the fixed member 102 and the adjusting wheel 302. The adjusting assembly 500 can comprise a first elastic member 501, a pressure knob 502, a retaining member 504, a second elastic member 506 and a pressure plate 508. The first elastic member 501 can be movably sleeved on the pressure knob 502. The pressure knob 502 can comprise a sleeve portion 5020 and a guiding portion 5022 which are provided in a coaxial manner. A radial dimension of the guiding portion 5022 can be larger than that of the sleeve portion 5020, such that a step S024 can be formed between the guiding portion 5022 and the sleeve portion 5020. The first elastic member 501 can be sleeved on the sleeve member 5020 and abut against the step S024. In some embodiments, the first elastic member 501 can be a coil spring. It will be appreciated that, the first elastic member 501 can be provided as other elastic members including a leaf spring and an elastic sleeve made of an elastic material.

The sleeve portion 5020 can be fixedly engaged with the snapping portion 3020 of the adjusting wheel 302 to enable the pressure knob 502 to rotate together with the adjusting wheel 302. In some embodiments, the sleeve portion 5020 can be engaged with the snapping portion 3020 by a form fit. For instance, the sleeve portion 5020 and the snapping portion can be provided with a substantially square shape, and a size of the sleeve portion 5020 can be slightly larger than that of the snapping portion 3020, such that the snapping portion 3020 can be sleeved on the sleeve portion 5020. It will be appreciated that, the sleeve portion 5020 can be engaged with the snapping portion 3020 by other means including a thread fit, a snap fit or an interference fit, as long as a relative rotation between the adjusting wheel 302 and the pressure knob 502 can be prevented when they are fixedly mated with each other.

The sleeve portion 5020 can be movably sleeved on the mating portion 1030 of the central shaft 103. In some embodiments, an external thread can be provided on the mating portion 1030 and an internal thread (not shown) can be provided on an inner wall of the sleeve portion 5020, such that the sleeve portion 5020 can move axially relative to the mating portion 1030. It will be appreciated that, the sleeve portion 5020 can be coupled to the mating portion 1030 with other mating structures, such that the pressure knob 502 can be moved axially relative to the central shaft 103 once the pressure knob 502 is driven by an external force, and the pressure knob 502 can be relatively stationary with respect to the central shaft 103 once the external force is removed. Therefore, a user can adjust a pressure between the adjusting wheel 302 and the fixed member 102 by changing a position of the pressure knob 502 with respect to the central shaft 103.

In some instances, the sleeve portion 5020 can be coupled to the mating portion 1030 by a snap fit. For instance, a plurality of snapping portions can be provided on the mating portion 1030. The plurality of snapping portions can be axially spaced apart from each other along the mating portion 1030. The sleeve portion 5020 can be movably disposed on the mating portion 1030. The sleeve portion 5020 can be provided with an engaging portion which engages with one of the plurality of snapping portions to position the pressure knob 502 on the central shaft 103. The position of the pressure knob 502 with respect to the central shaft 103 can be adjusted by pushing the pressure knob 502 to detach the engaging portion from said one of the plurality of the snapping portions and then engaging the engaging portion with another one of the plurality of the snapping portions. In this way, the pressure between the adjusting wheel 302 and the fixed member 102 can be adjusted. In some instances, the snapping portions can be grooves recessed into the mating portion 1030, and the engaging portion can be a protrusion formed on the sleeve portion 5020. Optionally, the snapping portion can be engaged with the engaging portion by a hook and a slot.

The retaining member 504 can be substantially a disk like. A through-hole 5042 can be provided in a middle of the retaining member 504. The through-hole 5042 can be sleeved on the central shaft 103. At least one stopper 5044 can be provided which extends axially from a side of the retaining member 504 remote from the pressure knob 502. In some embodiments, four stoppers 5044 can be provided which are evenly distributed at the side of the retaining member 504 remote from the pressure knob 502 along a radial direction. At least one mounting portion 5040 can be provided which extends from a side of the retaining member 504 facing the pressure knob 502 along an axial direction. The at least one mounting portion 5040 can be fixed to an inner structure of the hand wheel 304, such that the retaining member 504 can be rotated with a rotation of the hand wheel 304.

The second elastic member 506 can be provided between the pressure plate 508 and the pressure knob 502. In some embodiments, the second elastic member 506 can be a wave spring. It will be appreciated that, the second elastic member can be other elastic members including a coil spring, a leaf spring or an elastic sleeve made of an elastic material.

The pressure plate 508 can comprise a pressure plate through-hole 5080, a first disk 5082 and a second disk 5084 which are provided in a coaxial manner. The pressure plate through-hole 5080 can be provided at a substantially central position of the first disk 5082 and the second disk 5084. A diameter of the second disk 5084 can be larger than a diameter of the first disk 5082. The guiding portion 5022 of the pressure knob 502 can be movably sleeved on the first disk 5082 to enable an axial movement relative to the first disk 5082. The pressure knob 502 can abut against the second disk 5084 when moving toward the second disk 5084.

A damping plate 70 can be provided between the pressure plate 508 and the fixed member 102. The damping plate 70 can be made of nylon or similar materials. At least one damping block 700 can be provided protruding from a side of the damping plate 70 facing the fixed member 102. In some embodiments, four damping blocks 700 can be provided which are evenly distributed at the side of the damping plate 70 facing the fixed member 102 along a radial direction. The number and shape of the damping blocks 700 can correspond to the accommodation holes 3068 which is formed between adjacent spokes 3066 of the mating wheel 306. In this way, the damping blocks 700 can be respectively accommodated in the accommodation holes 3068, and the spokes 3066 can be respectively accommodated in spaces between the damping blocks 700. An end of the damping block 700 facing the fixed member 102 can be provided with an inclined surface. At least a part of the damping block 700 facing the fixed member 102 can make no contact with the carrying platform 1022 of the fixed member 102 when the damping block 700 is not deformed by a pressure. In some embodiments, a part of the damping block 700 in proximity to the central shaft 103 can make no contact with the carrying platform 1022. The part of the damping block 700 in proximity to the central shaft 103 can deform downwardly to contact the carrying platform 1022 under a downward pressure, and thus a contact area of the damping plate 70 and the carrying platform 1022 is increased. It will be appreciated that, the damping block 700 can contact the carrying platform 1022 at the part in proximity to the central shaft 103, while a part of the damping block 700 remote from the central shaft 103 makes no contact with the carrying platform 1022. The pressure plate 508 can abut against a part of the damping block 700 which makes no contact with the carrying platform 1022.

Figure 7:
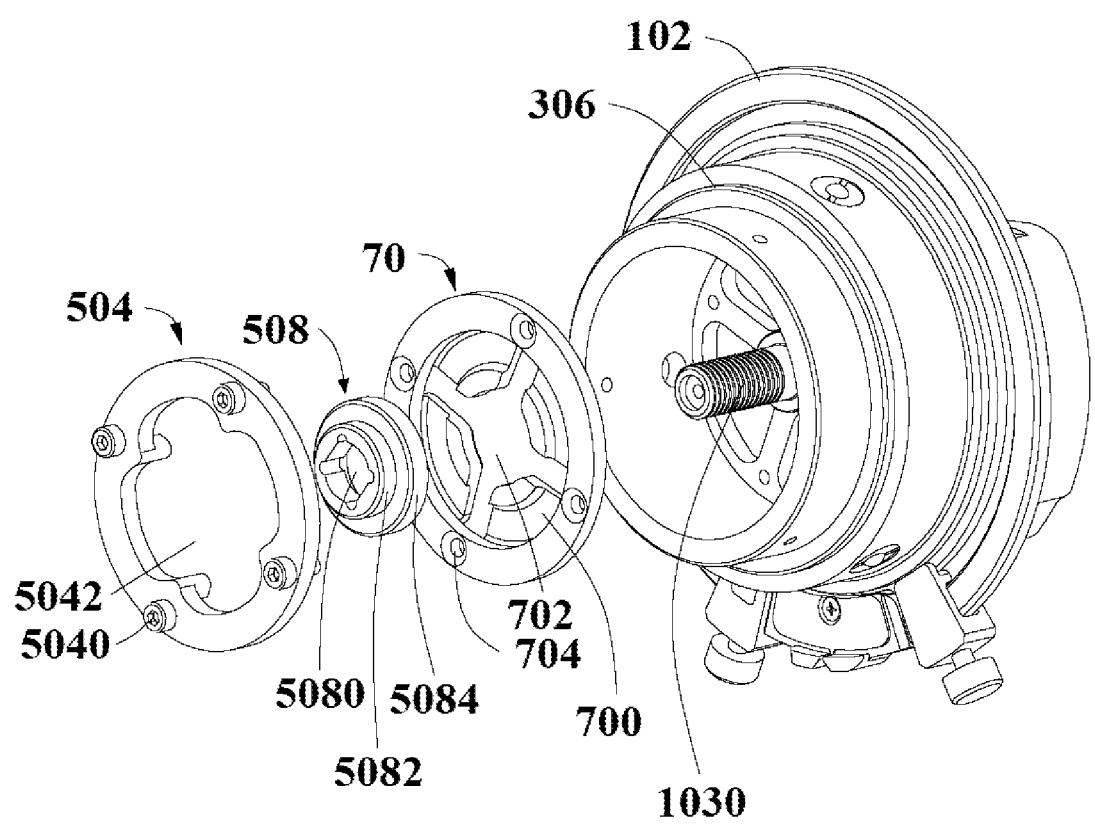
Figure 8:
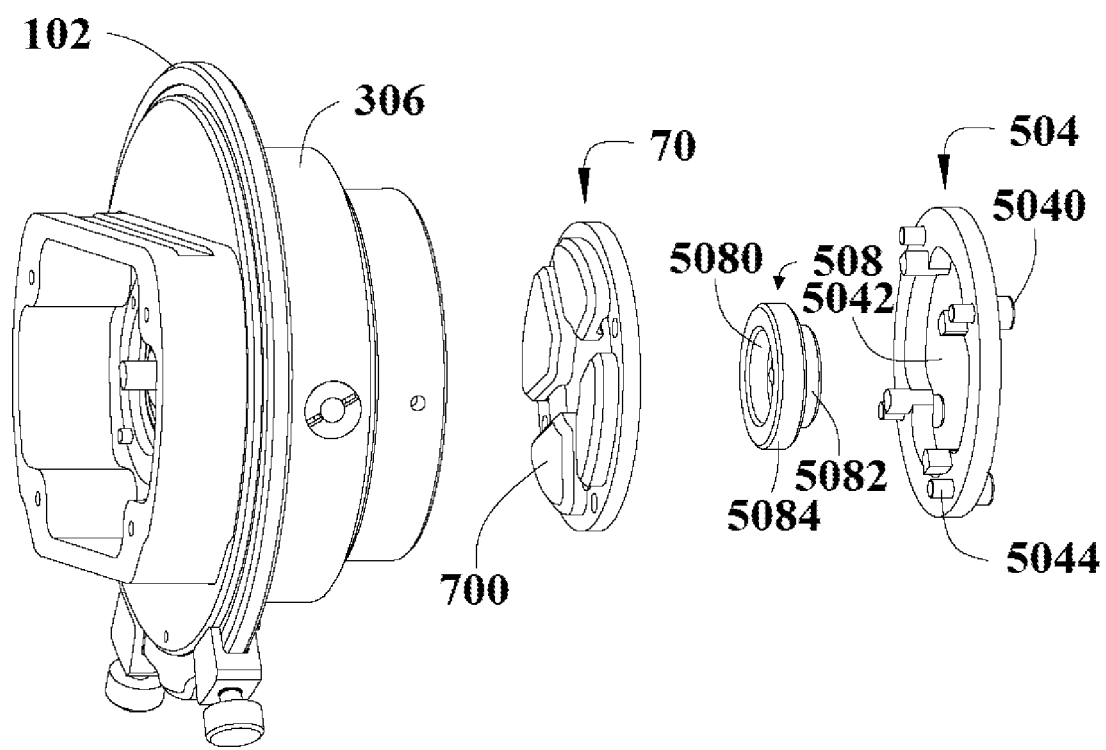
Figure 9:
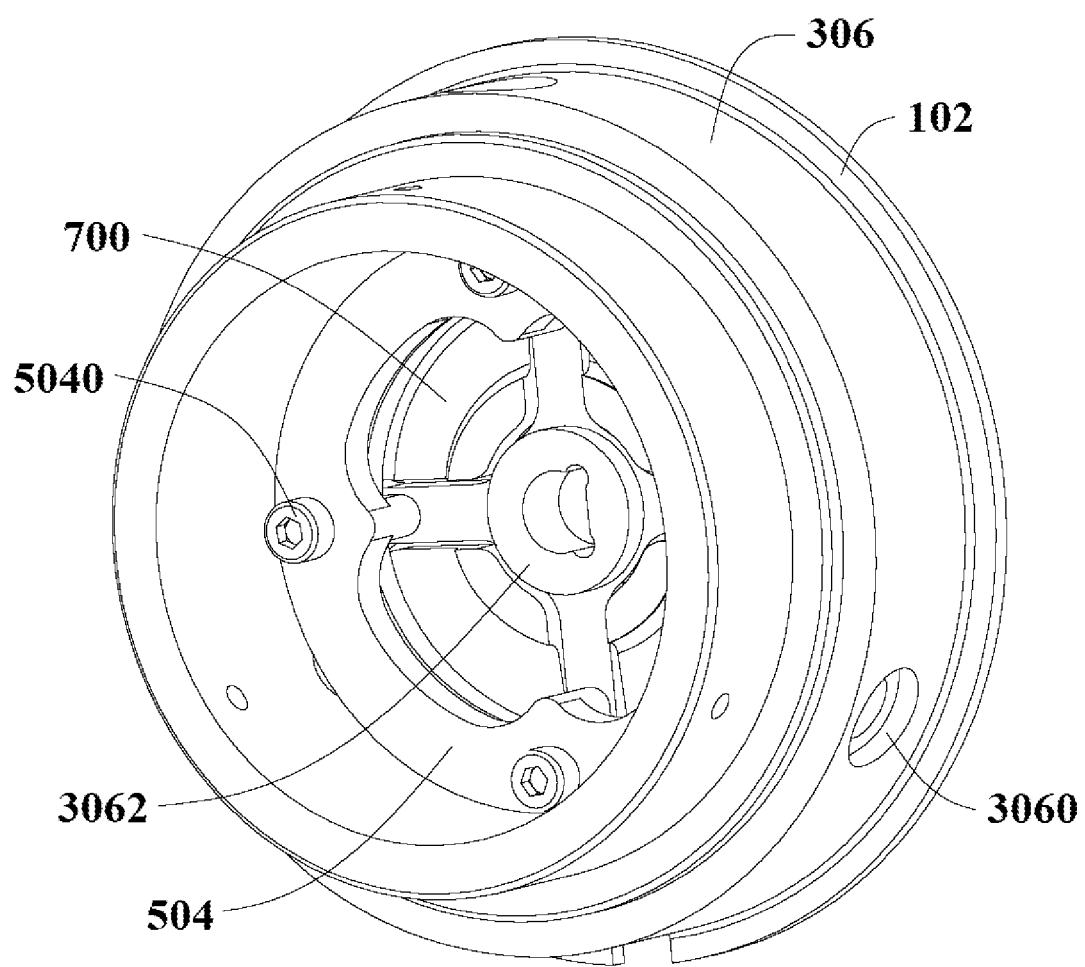
Figure 10:
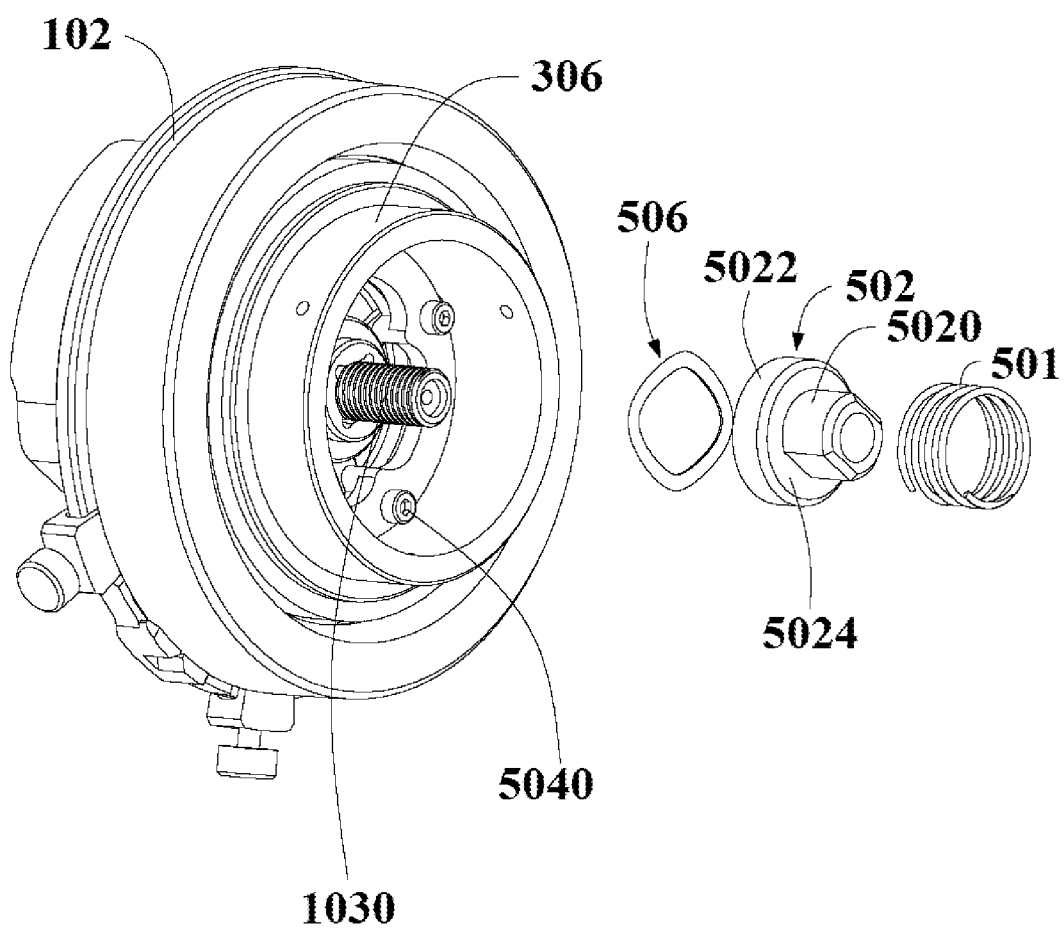

Referring to FIGS. 5-6, in assembling the knob structure 10 in accordance with embodiments of the disclosure, the mating portion 1030 of the central shaft 103 can first be fixed to the sheathing portion 1035, and then the central shaft 103 can pass through the bearing 101 and be rotatably fixed to the fixed member 102. Subsequently, the mating wheel 306 can be disposed on the fixed member 102, and the central shaft 103 can pass through the central through-hole 3064 of the mating wheel 306. Referring to FIGS. 7-9, the damping plate 70 can then be placed in the mating wheel 306, such that the damping blocks 700 of the damping plate 70 can be accommodated in the accommodation holes 3068 of the mating wheel 306 (as shown in FIG. 6), and the pressure plate 508 and the retaining member 504 can subsequently be disposed on the damping plate 70. Referring to FIG. 10, the central shaft 103 can then pass through the second elastic member 506, and the second elastic member 506 can be disposed on the pressure plate 508. Subsequently, the first elastic member 501 can be sleeved on the pressure knob 502. Next, the pressure knob 502 can be sleeved on the mating portion 1030 of the central shaft 103, and the guiding portion 5022 of the pressure knob 502 can be sleeved on the first disk 5082 of the pressure plate 508. Referring to FIGS. 11-12, the operating member 301 can then be mounted in the adjusting wheel 302, and the adjusting wheel 302 can subsequently be disposed in the hand wheel 304. Finally, the hand wheel 304, which is mounted with the operating member 301 and the adjusting wheel 302, can be snapped onto the mating wheel 306 and locked to the mating wheel 306 with a fixing element such as a screw. In the mean time, the snapping portion 3020 of the adjusting wheel 302 can be sleeved on the sleeve portion 5020 of the pressure knob 502.

In using the knob structure 10 in accordance with embodiments of the disclosure, a rotation angle of the knob structure 10 can be adjusted by rotating the operating member 301. If a damping between the rotational assembly 300 and the fixed member 102 is to be adjusted, the user can rotate the operating member 301 to drive a rotation of the adjusting wheel 302 and the pressure knob 502, so as to move the pressure knob 502 toward or away from the carrying platform 1022 of the fixed member 102 along an axial direction of the central shaft 103. The guiding portion 5022 of the pressure knob 502 can abut against the second disk 5084 of the pressure plate 508, thereby applying an axial pressure to the damping plate 70. The damping plate 70 can deform under the pressure exerted from the pressure plate 508 and an abutting force exerted from the stopper 5044 of the retaining member 504, such that a contact area between the damping blocks 700 and the carrying platform 1022 is increased to change the damping between the damping plate 70 and the fixed member 102. If an external rotary force is applied to the operating member 301 in an opposite direction, the operating member 301 can drive a rotation of the adjusting wheel 302 and the pressure knob 502 to move the pressure knob in a direction away from the pressure plate 508, thereby the pressure applied to the pressure plate 508 and the damping plate 70 is removed. The damping blocks 700 can thus elastically restores, and the contact area between the damping blocks 700 and the carrying platform 1022 can be decreased, leading to a change of the damping between the damping plate 70 and the fixed member 102.

It will be appreciate that, a damping grease can be provided between the damping blocks 700 and the fixed member 102 to further adjust the damping therebetween. The damping grease can also be provided to a part of the damping plate 70 contacting with the mating wheel 306 to adjust the damping between the damping plate 70 and the mating wheel 306. Once the hand wheel 304 is rotated, the mating wheel 306 can be driven by the hand wheel 304 to rotate collectively. A smooth and continuous feedback can be effected in rotating hand wheel due to the presence of the damping grease between the damping plate 70 and the mating wheel 306 and the damping grease between the damping blocks 700 and the fixed member 102.

It will be appreciated that, damping blocks 700 having various configurations can be provided, and a shape of the damping blocks 700 is not limited to the example described hereinabove. For instance, the damping blocks 700 can comprise a plurality of concentric annular damping blocks and radial damping blocks in a staggered arrangement. Optionally, the damping blocks 700 can be a plurality of concaves which are recessed from the mating portion 1030. Optionally, the damping blocks 700 can be provided with an irregular shape. The damping blocks 700 can be symmetrically or asymmetrically distributed on one side of the damping plate 70, and the damping blocks 700 can be evenly or unevenly distributed on one side of the damping plate 70, as long as the contact area between the damping blocks 700 and the carrying platform 1022 of the fixed member 102 can be changed by a deformation of the damping blocks 700 under a pressure. It will be appreciated that, if the damping blocks 700 are provided with another shape, a shape of the corresponding accommodation holes 3068 on the mating wheel 306 can accordingly be changed to adapt to the shape of the damping blocks 700. In the meantime, a shape of the retaining member 504 can accordingly be adapted to prevent the damping blocks 700 from releasing from the carrying platform 1022 due to an upward deformation of the damping blocks 700 under a pressure.

It will be appreciated that, the retaining member 504 can be omitted. In this case, a shape of the pressure plate 508 can accordingly be changed to directly press against an upper surface of the damping plate 70. Meanwhile, the pressure plate 508 can apply a pressure onto the damping plate 70 and prevent the damping plate 70 from releasing from the carrying platform due to an upward deformation. For example, two protruding portions having different heights can be provided on a side of the pressure plate 508 facing the damping plate 70, where a height of a first protruding portion in proximity to the central shaft can be lower than a height of a second protruding portion remote from the central shaft. Therefore, when a pressure from the pressure plate is applied to the damping plate 70, no upward deformation can occur to the inclined surfaces of the damping plate 70, and only a downward deformation can occur to increase the contact area with the carrying platform 1022.

It will be appreciated that, the pressure plate 508 can be omitted. In this case, the guiding portion 5022 of the pressure knob 502 can directly abut against the damping plate 70.

It will be appreciated that, one or both of the first elastic member 501 and the second elastic member 506 can be omitted. In this case, the pressure knob 502 can be directly sleeved on the central shaft 103 and abut against the damping plate 70. The presence of the first elastic member 501 and the second elastic member 506 can increase a range of the damping adjustment. It will be appreciated that, the range of the damping adjustment can be adjusted by changing elastic coefficients of the first elastic member 501 and the second elastic member 506.

It will be appreciated that, the mating portion 1030 and the sheathing portion 1035 of the central shaft 103 can be assembled together or formed integrally. In some instances, the mating portion 1030 can be fixedly provided at the adjusting wheel 302 and connected to the fixed member 102 by the sheathing portion 1035 of the central shaft 103.

Figure 13:
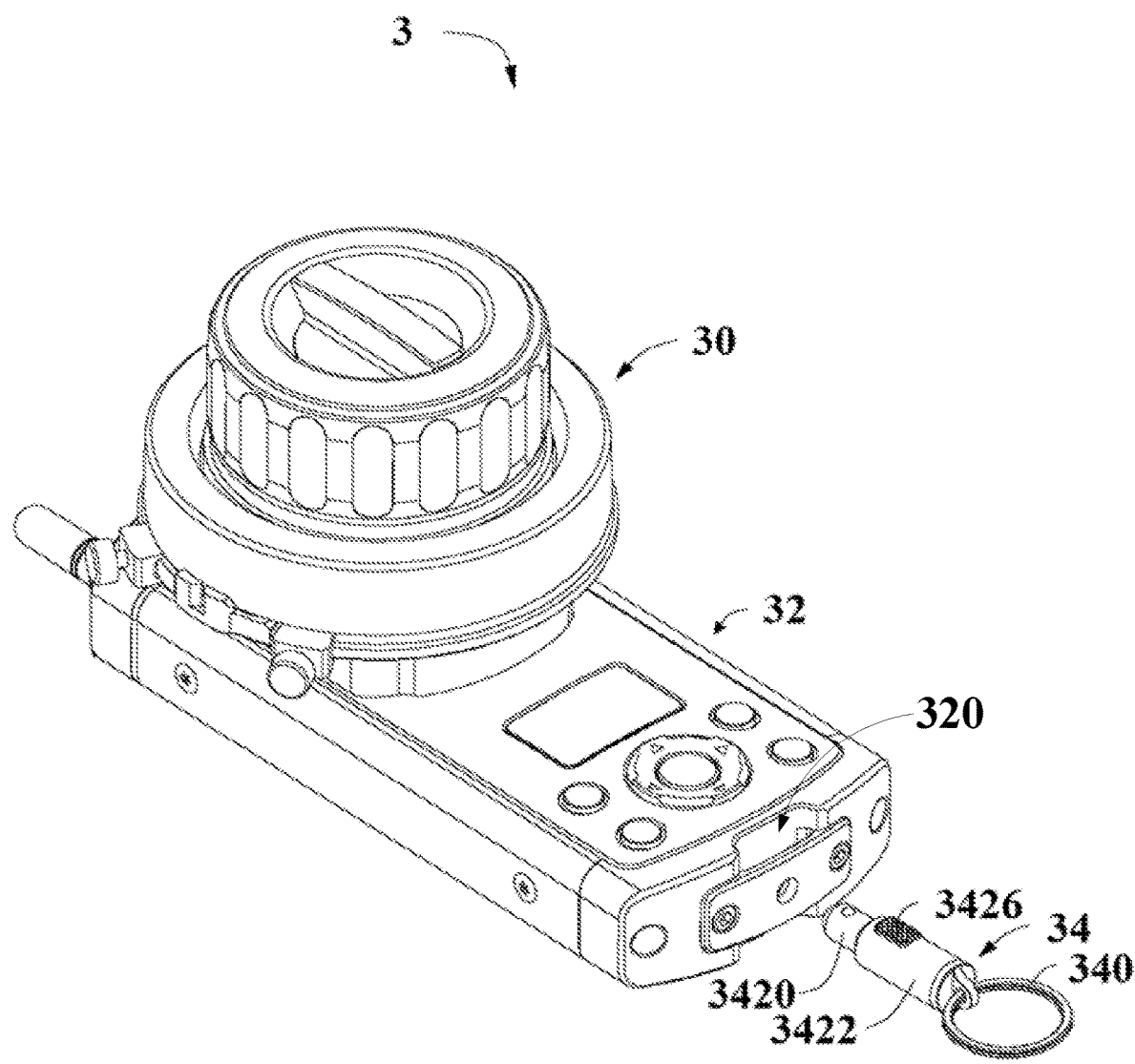
FIG. 13 shows another follow-focus remote controller in accordance with embodiments of the disclosure.

FIG. 13 shows another follow-focus remote controller 3 in accordance with embodiments of the disclosure. The follow-focus remote controller 3 can comprise a knob structure 30, a remote controller body 32 and a dangling structure. The dangling structure can be provided to allow a wearing piece such as a hanging string or a hanging bracelet to pass therethrough to assist a user to carry the follow-focus remote controller 3. The knob structure can be a knob structure provided in the embodiments described hereinabove. In some embodiments, the dangling structure can comprise a holding hole 320 provided on the remote controller body 32 and a dangling member 34. The dangling member 34 can be detachably mounted on the remote controller body 32. In some embodiments, the dangling member 34 can be detachably inserted into the holding hole 320 to mount the dangling member 34 on the remote controller body 32.

Figure 14:
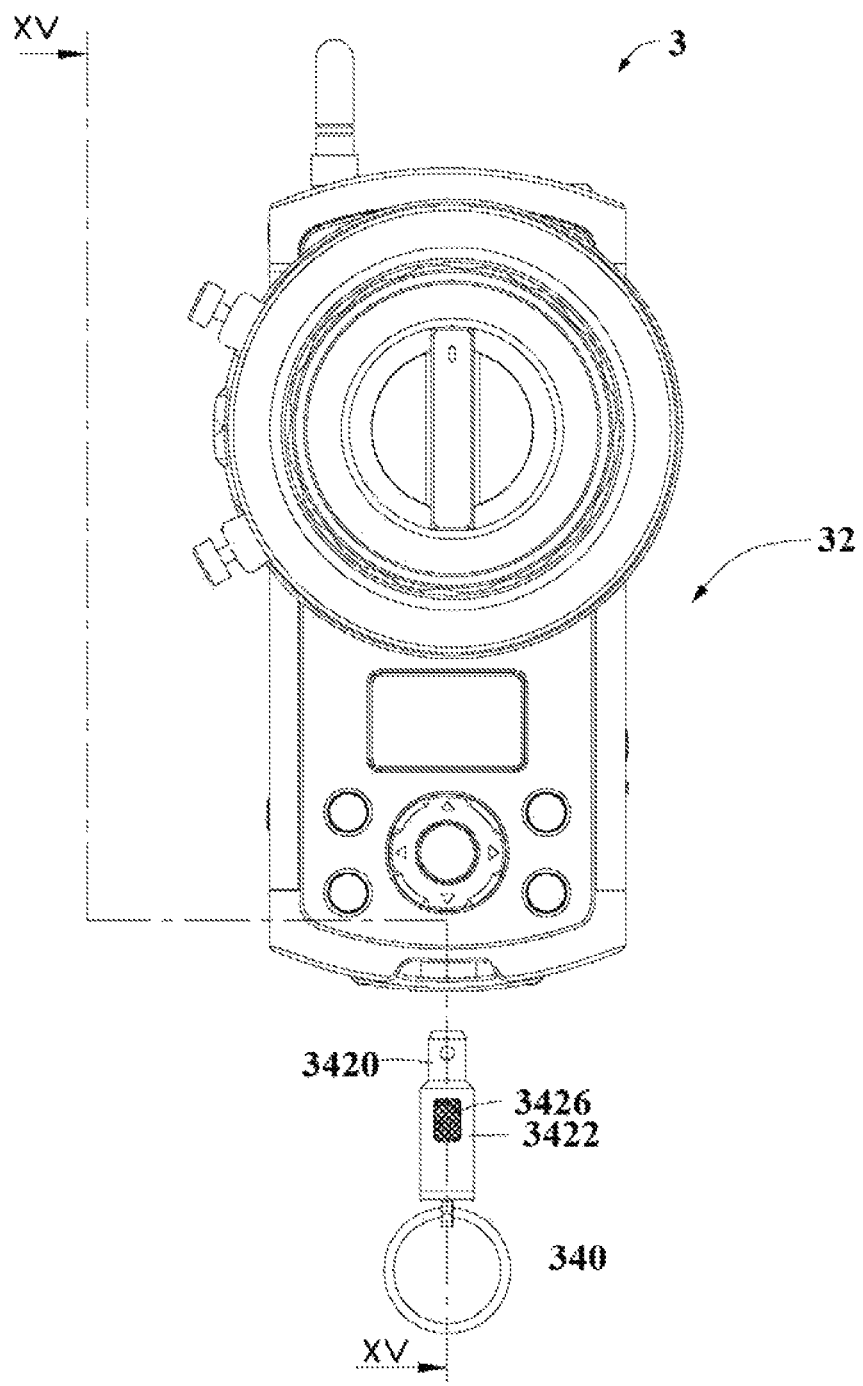
FIG. 14 shows the follow-focus remote controller of FIG. 13 in a first state.
Figure 15:
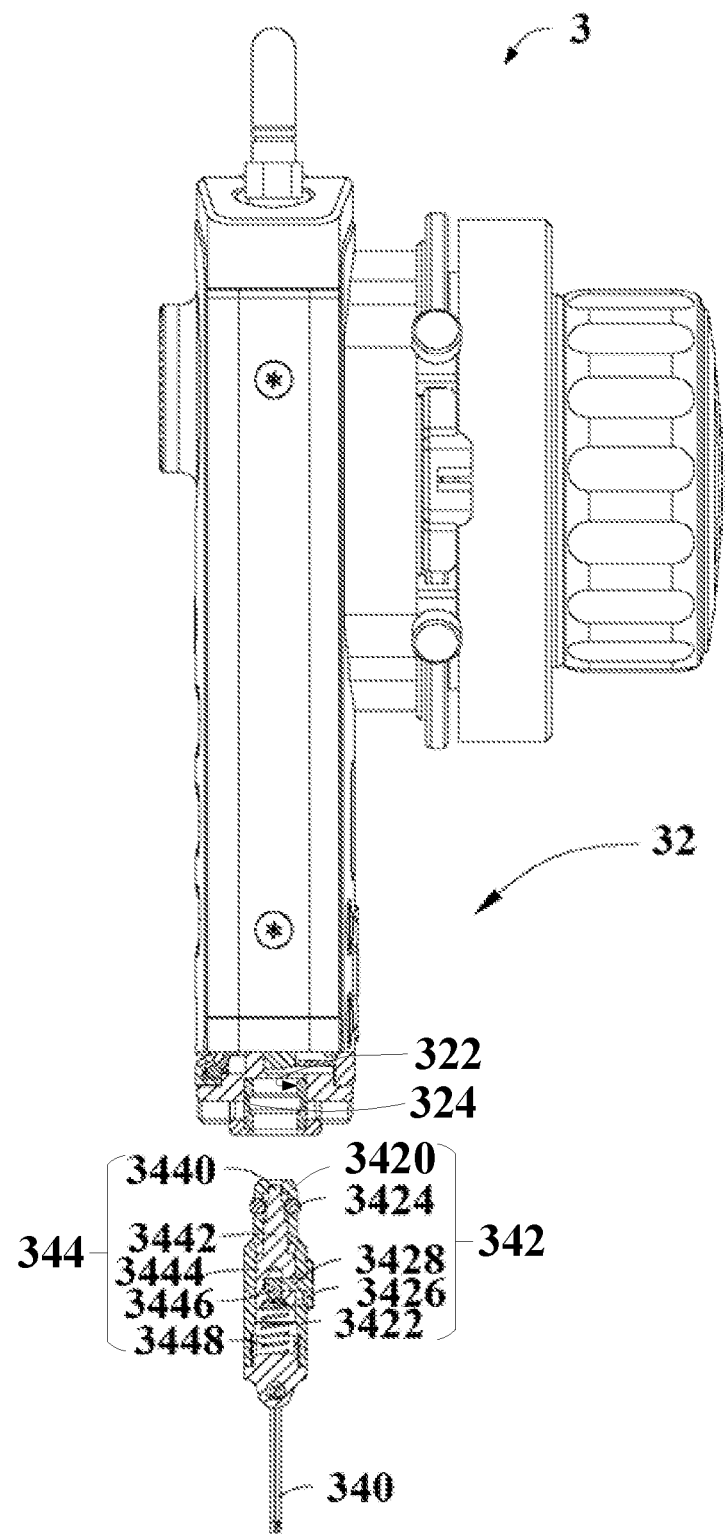
FIG. 15 is a partial cross-sectional view of the follow-focus remote controller of FIG. 14 along an XV-XV line.

Referring to FIGS. 14-15, a top view and a partial cross-sectional view of the follow-focus remote controller 3 of FIG. 13 in a first state are shown. In the first state, the dangling member 34 is not mounted on the remote controller body 32. The holding hole 320 of the remote controller body 32 can comprise an inner wall 322 provided with a groove 324. The dangling member 34 can comprise a hanging ring 340, a casing 342 and a movable member 344. The hanging ring 340 can be fixed on the casing 342 for a user to carry. The movable member 344 can slide axially relative to the casing 342.

The casing 342 can comprise an insertion portion 3420, an operating portion 3422, a protrusion 3424, a slider 3426 and a plug 3428. The insertion portion 3420 can be detachably inserted into the holding hole 320. The protrusion 3424 can be held in the groove 324 of the inner wall 322 when the insertion portion 3420 is inserted into the holding hole 320, such that the dangling member 34 can be prevented from releasing from the remote controller body 32. A radial dimension of the operation portion 3422 can be larger than a radial dimension of the insertion portion 3420, therefore an axial movement of the dangling member 34 toward the remote controller body 32 can be limited. It will be appreciated that, the radial dimension of the operation portion 3422 can be less than or equal to a radial dimension of the insertion portion 3420, in which case a bottom of the holding hole 320 can limit a further axial movement of the insertion portion 3420 when the insertion portion 3420 is inserted into the holding hole 320. The protrusion 3424 can be provided on the insertion portion 3420, and can be deformed under an external force. The slider 3426 can be provided on the operating portion 3422, and can slide axially relative to the casing 342 under an external force. The plug 3428 can be provided on one side of the slider 3426 and fixed to the movable member 344 through the casing 342.

The movable member 344 can comprise a first end portion 3440, a middle portion 3442, a sliding portion 3444, a locking portion 3446 and a third elastic member 3448. A radial dimension of the first end portion 3440 can be less than a radial dimension of the middle portion 3442. The locking portion 3446 can be provided on the sliding portion 3444 to lock the plug 3428. One end of the third elastic member 3448 can be fixedly provided inside the casing 342, and the other end can be fixedly connected to the locking portion 3446. When the slider 3426 does not slide under an external force, the middle portion 3442 can radially abut against the protrusion 3424, such that the protrusion 3424 can be deformed to protrude to an outside of the insertion portion 3420. When the slider 3426 slides toward the hanging ring 340 under an external force, the plug 3428 and the locking portion 3446 can be driven by the slider 3426 to slide in a direction away from the insertion portion 3420, such that the third elastic member 3448 can be compressed. At this point, the middle portion 3442 can be positioned away from the protrusion 3424, such that the protrusion 3424 can restore. Once the external force applied onto the slider 3426 is removed, third elastic member 3448 can elastically restore and the locking portion 3446 and the plug 3428 can be driven to slide toward the insertion portion 3420. In this way, the middle portion 3442 can press against the protrusion 3424, and the protrusion 3424 can protrude to an outside of the insertion portion 3420.

Figure 16:
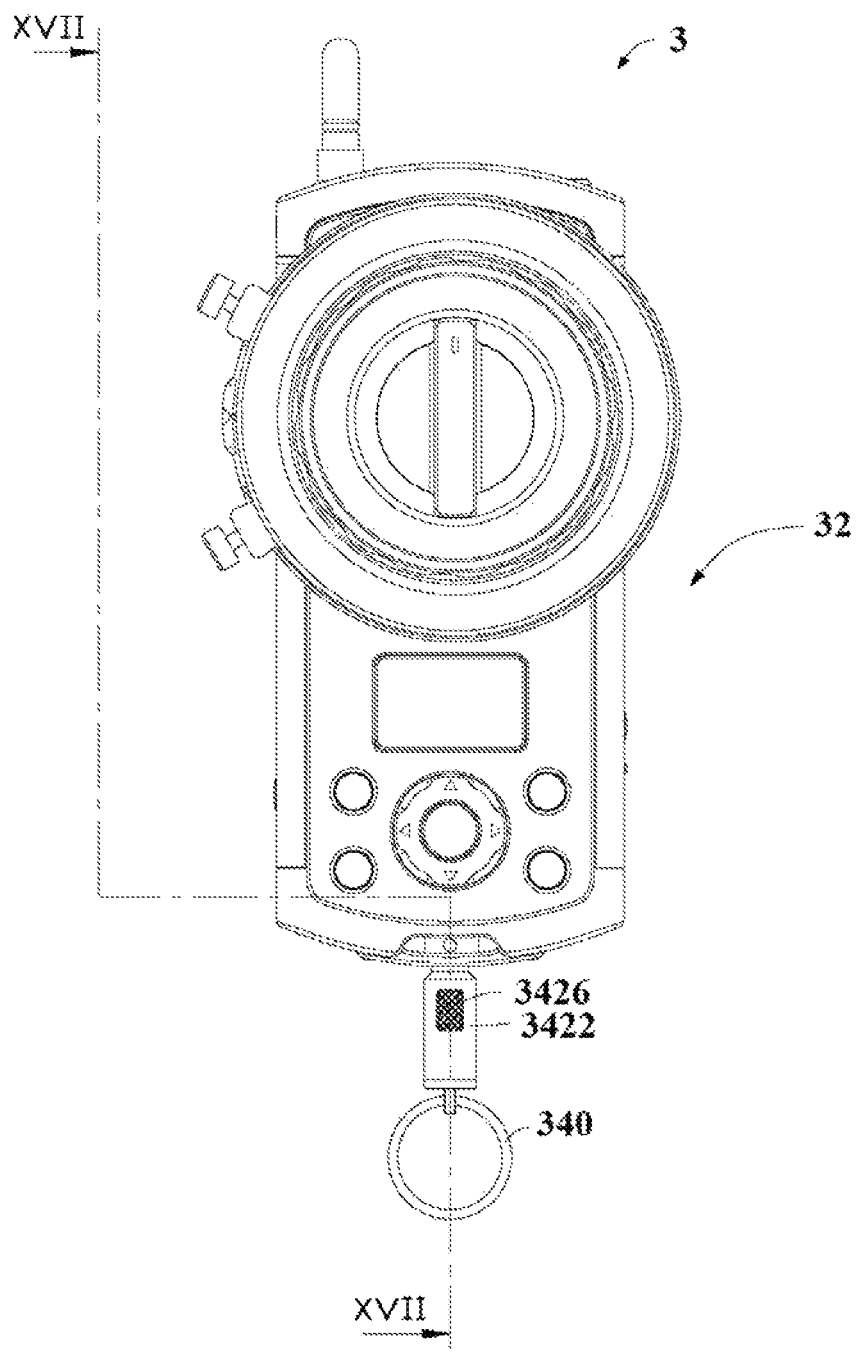
FIG. 16 shows the follow-focus remote controller of FIG. 13 in a second state.
Figure 17:
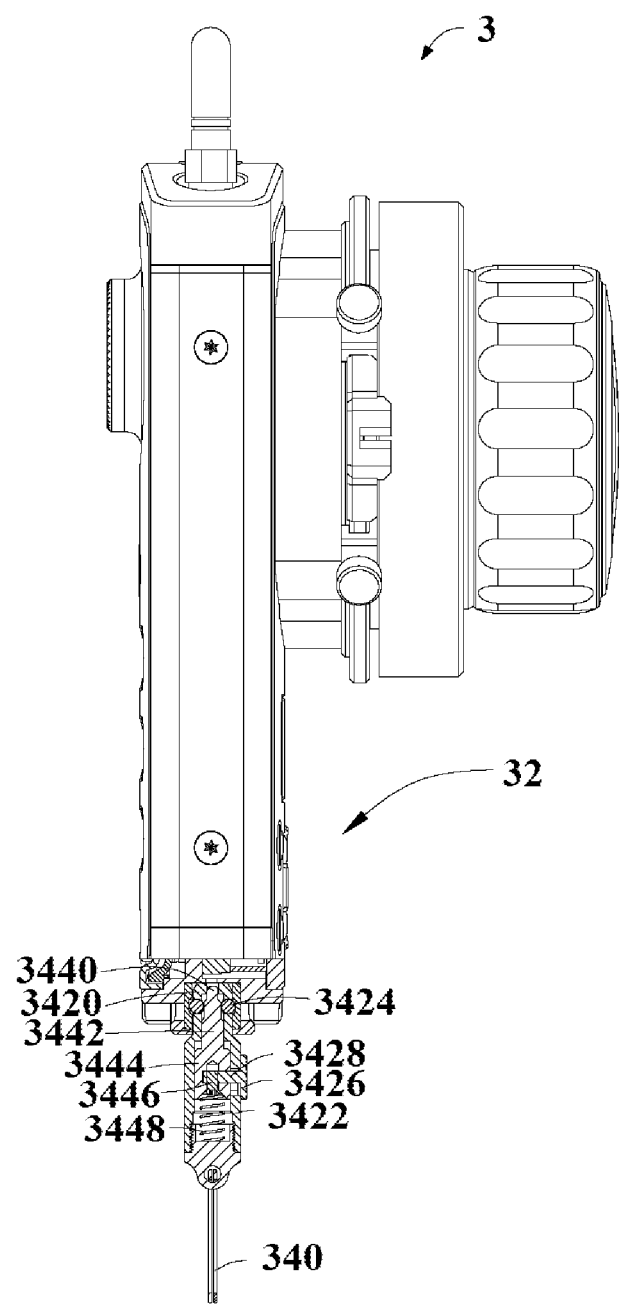
FIG. 17 is a partial cross-sectional view of the follow-focus remote controller of FIG. 16 along an XVII-XVII line.

Referring to FIGS. 16-17, a top view and a partial cross-sectional view of the follow-focus remote controller 3 of FIG. 13 in a second state are shown. In the second state, the dangling member 34 is mounted onto the remote controller body 32. When no external force is applied to the slider 3426, the protrusion 3424 can protrude to an outside of the insertion portion 3420. The protrusion 3424 can be pressed and deformed by the inner wall 322 of the holding hole 320 when the insertion portion 3420 is inserted into the holding hole 320. The protrusion 3424 can restore once it enters into the groove 324 of the inner wall 322, and thus can be held by an inner wall of the groove 324. In this way, an axial movement of the protrusion 3424 can be limited. When the slider 3426 slides in a direction away from the insertion portion 3420 under an external force, the plug 3428 and the locking portion 3446 can be driven to move in the direction away from the insertion portion 3420, such that the first end portion 3440 and the middle portion 3442 can accordingly move in the direction away from the insertion portion 3420. The middle portion 3442 can be positioned away from the protrusion 3424 when the first end portion 3440 reaches a position of the protrusion 3424. At this point, a radial pressing force applied to the protrusion 3424 from the middle portion 3442 can disappear, and thus the protrusion 3424 can restore due to a smaller radial dimension of the first end portion 3440 as compared to the middle portion 3442. Therefore, the protrusion 3424 can be released from the groove 324 to detach the dangling member 34 from the holding hole 320.

It will be appreciated that, the dangling member 34 can be omitted. In this case, a through-hole for passing a hanging string therethrough can be directly provided at the remote controller body 32.

It will be appreciated that, the hanging ring 340 can be replaced with any suitable wearing pieces including a hanging string or a bracelet.

It will be appreciated that, a shape of the protrusion 3424 is not limited to the examples illustrated in the drawings. The protrusion 3424 can be provided in any appropriate shape including a square, a trapezoidal, a star, an oval shape or other suitable shape. Accordingly, a shape of the groove 324 can be adapted to the shape of the protrusion 3424. The structure enabling a radial movement of the protrusion 3424 is not limited to the examples provided in the embodiments of the disclosure. The structure enabling a radial movement of the protrusion 3424 can be any suitable structure enabling a radial movement under an external force. The protrusion 3424 can move toward an inside of the casing 342 under the external force, and can return to its initial position and protrude to an outside of the casing 342 once the external force is removed. For example, the protrusion 3424 can be driven to move toward the inside of the casing 342 by applying a radial external force to a button provided on the casing 342, such that the protrusion 3424 can be released from the groove 324. The protrusion 3424 can return to its initial position and protrude to an outside of the casing 342 once the radial external force is removed, and thus can be held in the groove 324.

It will be appreciated that, the groove 324 can be replaced with any suitable abutting structure provided on the inner wall 322, such as a protrusion or a hook. Accordingly, the protrusion 3424 can be retracted into an inside of the casing 342 under an external force, such that the protrusion 3424 can move to a side of the protrusion or hook remote from the dangling member 34 when the insertion portion 3420 is inserted into the holding hole 320. The protrusion 3424 can return to its initial position and be held by the protrusion or hook when the external force is removed, thereby fixing the hanging 34 to the remote controller body 32. When the dangling member 34 is to be removed from the remote controller body 32, an external force can be applied to move the protrusion 3424 toward an inside of the casing 342, such that the protrusion 3424 can be released from the protrusion or hook, and the dangling member 34 can thus be removed.

It will be appreciated that, the first end portion 3440 can be omitted providing that the middle portion 3442 can abut/release the protrusion 3424 during a radial movement thereof relative to the casing.

Numerous variations and modifications will occur to those skilled in the art in accordance with the teaching of the disclosure, and such variations and modifications should all fall into the scope of the disclosure.

What is claimed is:
1. A knob structure comprising:
   a fixed member including a carrying platform;
   a rotational assembly and a central shaft rotatably disposed on the fixed member, the rotational assembly including a hand wheel and an adjusting wheel disposed on the hand wheel, the adjusting wheel is configured for rotation relative to the hand wheel;
   a pressure knob rotatably disposed on, and threadably engaged with, the central shaft; and
   a damping element disposed between the carrying platform and the rotational assembly;
   the adjusting wheel engages the pressure knob such that the rotation of the adjusting wheel relative to the hand wheel produces axial movement of the pressure knob relative to the central shaft;
   the axial movement of the pressure knob is configured to apply an axial pressure on the damping element, and
   a contact area between the carrying platform and the damping element is configured to be changed by the axial pressure on the damping element.
2. The knob structure of claim 1, wherein a side of the damping element facing the fixed member includes an inclined surface.

3. The knob structure of claim 1,
   wherein the rotational assembly and the damping element are sleeved on the central shaft.
4. The knob structure of claim 3, wherein:
   the rotational assembly includes:
      a mating wheel rotatably disposed on the fixed member;
      the hand wheel is sleeved on the mating wheel;
      an operation member provided on the adjusting wheel, a rotation of the operation member driving the adjusting wheel to rotate; and
   the adjusting wheel, the hand wheel, and the mating wheel are sleeved on the central shaft and configured to rotate along with the central shaft.
5. The knob structure of claim 4, wherein:
   the pressure knob is fixedly connected to the adjusting wheel and
   configured to move axially relative to the central shaft when being rotated.
6. The knob structure of claim 5, further comprising:
   an elastic member provided between the adjusting wheel and the pressure knob, and sleeved on the pressure knob.
7. The knob structure of claim 5, further comprising:
   a retaining member disposed between the rotational assembly and the damping element;
   wherein the retaining member abuts against the damping element to prevent the damping element from releasing from the fixed member due to an upward deformation of the damping element.
8. The knob structure of claim 4, further comprising:
   a damping grease provided between the damping element and the mating wheel.
9. The knob structure of claim 1, further comprising:
   a damping grease provided between the damping element and the carrying platform.
10. A follow-focus remote controller comprising:
   a remote controller body; and
   a knob structure fixedly disposed on the remote controller body and including:
      a fixed member including a carrying platform;
      a rotational assembly and a central shaft rotatably disposed on the fixed member, the rotational assembly including a hand wheel and an adjusting wheel disposed on the hand wheel, the adjusting wheel is configured for rotation relative to the hand wheel;
      a pressure knob rotatably disposed on, and threadably engaged with, the central shaft; and
      a damping element disposed between the carrying platform and the rotational assembly;
      the adjusting wheel engages the pressure knob such that the rotation of the adjusting wheel relative to the hand wheel produces axial movement of the pressure knob relative to the central shaft;
      the axial movement of the pressure knob is configured to apply an axial pressure on the damping element, and
      a contact area between the carrying platform and the damping element is configured to be changed by the axial pressure on the damping element.
11. The follow-focus remote controller of claim 10, wherein a side of the damping element facing the fixed member includes an inclined surface.
12. The follow-focus remote controller of claim 10, wherein:
   the rotational assembly and the damping element are sleeved on the central shaft.

13. The follow-focus remote controller of claim 12, wherein:
the rotational assembly includes:
a mating wheel rotatably disposed on the fixed member;
the hand wheel is sleeved on the mating wheel;
an operation member provided on the adjusting wheel, a rotation of the operation member driving the adjusting wheel to rotate; and
the adjusting wheel, the hand wheel, and the mating wheel are sleeved on the central shaft and configured to rotate along with the central shaft.

14. The follow-focus remote controller of claim 13, wherein:
the pressure knob is fixedly connected to the adjusting wheel and
configured to move axially relative to the central shaft when being rotated.

15. The follow-focus remote controller of claim 14, wherein the knob structure further includes an elastic member provided between the adjusting wheel and the pressure knob, and sleeved on the pressure knob.

16. The follow-focus remote controller of claim 14, wherein:
the knob structure further includes a retaining member disposed between the rotational assembly and the damping element; and
the retaining member abuts against the damping element to prevent the damping element from releasing from the fixed member due to an upward deformation of the damping element.

17. The follow-focus remote controller of claim 13, wherein the knob structure further includes a damping grease provided between the damping element and the mating wheel.

18. The follow-focus remote controller of claim 10, wherein the knob structure further includes a damping grease provided between the damping element and the carrying platform.

19. The follow-focus remote controller of claim 10, further comprising:
a dangling structure including a wearing member.

20. The follow-focus remote controller of claim 19, wherein:
the dangling structure includes a dangling member including a protrusion;
the remote controller body includes a holding hole including an abutting portion provided on an inner wall of the holding hole; and
the protrusion is held by the abutting portion when the dangling member is fixed to the remote controller body.

* * * * *